United States Patent
Affaticati et al.

(10) Patent No.: US 6,958,600 B1
(45) Date of Patent: Oct. 25, 2005

(54) MAGNETIC ABSOLUTE ANGULAR POSITION SENSOR FOR VALVES CONTROLLED BY ELECTRIC PART-TURN ACTUATORS

(75) Inventors: Archimede Affaticati, Fiorenzuola D'Arda (IT); Giordano Alfieri, Parma (IT)

(73) Assignee: Biffi Italia S.R.L., Fiorenzuola D'Arda (IT)

( * ) Notice: Subject to any disclaimer, the term of this patent is extended or adjusted under 35 U.S.C. 154(b) by 0 days.

(21) Appl. No.: 10/980,157

(22) Filed: Nov. 4, 2004

(30) Foreign Application Priority Data

May 11, 2004 (IT) .......................... PR2004A0037

(51) Int. Cl.[7] .............................................. G01B 7/30
(52) U.S. Cl. ................. 324/207.25; 324/174
(58) Field of Search ................ 324/151 R, 154 R, 324/166, 173–174, 207.19–207.25, 244, 324/251–252, 260; 123/406.58, 612, 617

(56) References Cited

U.S. PATENT DOCUMENTS

| | | | |
|---|---|---|---|
| 5,055,781 A * | 10/1991 | Sakakibara et al. | .... 324/207.21 |
| 6,326,781 B1 * | 12/2001 | Kunde et al. | .......... 324/207.21 |
| 6,498,479 B1 * | 12/2002 | Hamaoka et al. | ........ 324/207.2 |
| 2004/0095132 A1 * | 5/2004 | Carlson et al. | ........ 324/207.22 |

* cited by examiner

Primary Examiner—Bot LeDynh
(74) Attorney, Agent, or Firm—Young & Thompson

(57) ABSTRACT

The invention finds application in the field of electric valve actuators.

Particularly, the invention relates to a magnetic absolute angular position sensor for valves controlled by electric part-turn actuators, wherein the rotation α of the valve shaft (10) induces a change in the direction along which the lines of the magnetic field generated by a magnet (8) integral therewith, pass through a stationary circuit board (7), containing two Wheatstone bridges arranged at 45° to each other, and made of a magneto-resistive material. Hence, two 90° electric signals X and Y are generated, having the same amplitude, which allow to uniquely determine the angle of rotation α of the shaft (10).

5 Claims, 4 Drawing Sheets

MAGNETIC ABSOLUTE ANGULAR POSITION SENSOR FOR VALVES CONTROLLED BY ELECTRIC PART-TURN ACTUATORS

This invention relates to a magnetic absolute angular position sensor for valves controlled by part-turn electric actuators.

These valves are shut-off members which are fitted on pipes or machines in which the supply or discharge flow is to be controlled or stopped; fluid flow rate may be stopped or reduced by using parts to be lifted from a stationary seat, on which they sealably abut, or parts that rotatably uncover a port of variable width.

Valves are actuated by electric part-turn actuators which control the rotation of the valve shaft by electric remote controls, particularly when valves are located in hardly reachable positions, such as desert areas or sea bottoms.

This type of actuation, which uses electric actuators, imperatively requires the angular position of the valve shaft to be exactly known at any time, so that its opening degree may be determined, as well as the corresponding electric control: such angular position value of the shaft is detected by a sensor.

In prior art, several different angular position sensors are provided, such as:
- a sliding contact potentiometer;
- a unit for detecting the capacitance generated by the relative rotation of two facing disks;
- a linear inductance method, for acquiring the electric signal generated by the motion of a magnet within winding turns.

The drawbacks of prior art are:
- inaccurate angular position reading as the control unit temperature changes due to a sudden change in the temperature of such sensors;
- poor repeatability of readings, due to the wear of sliding contacts;
- considerable maintenance efforts, for worn part replacement;
- complex electronic equipment, having a considerable size.

The object of this invention is to allow accurate determination of the angular position of an electrically actuated valve shaft, by using a magnetic sensor.

The advantages achieved by using the magnetic angular position sensor of this invention are:
- an accurate determination of the angle of rotation of the angular valve shaft, over a temperature range of −40° C. to +85° C.;
- repeatability of readings at later times;
- a fast and safe installation, with no initial resets.

These objects and advantages are achieved by the magnetic sensor of this invention, which is characterized by the annexed claims.

These and other characteristics will be more apparent from the following description of a few embodiments, which are shown by way of example and without limitation in the accompanying drawings, in which.

Figure 1:
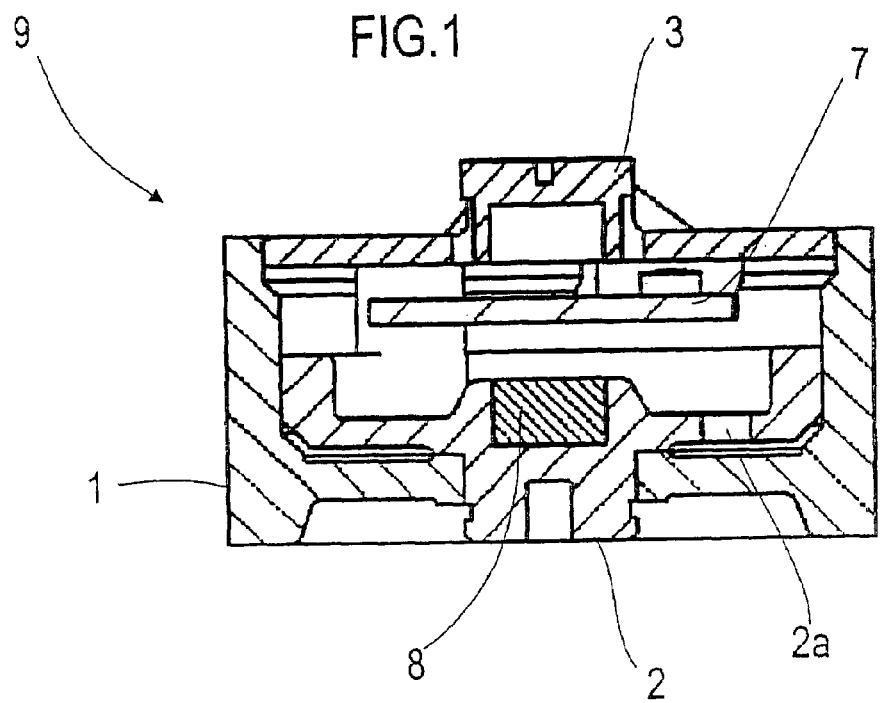
FIG. 1 is a sectional view taken along line 1—1 of FIG. 3.
Figure 2:
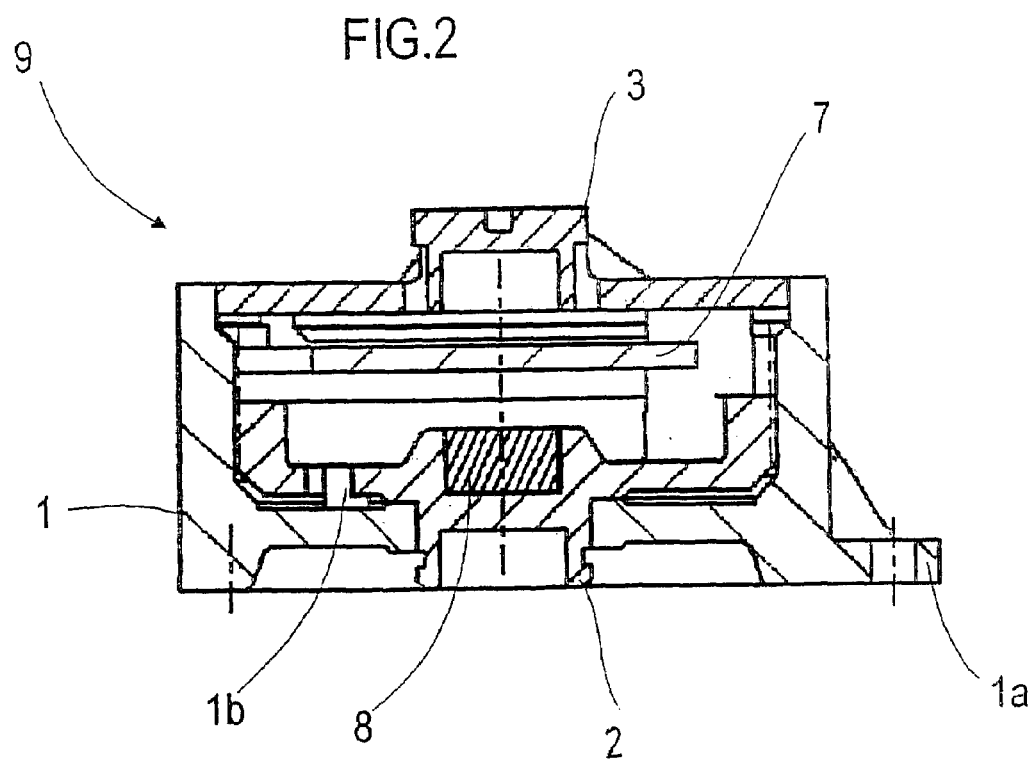
FIG. 2 is a sectional view taken along line 2—2 of FIG. 3.
Figure 3:
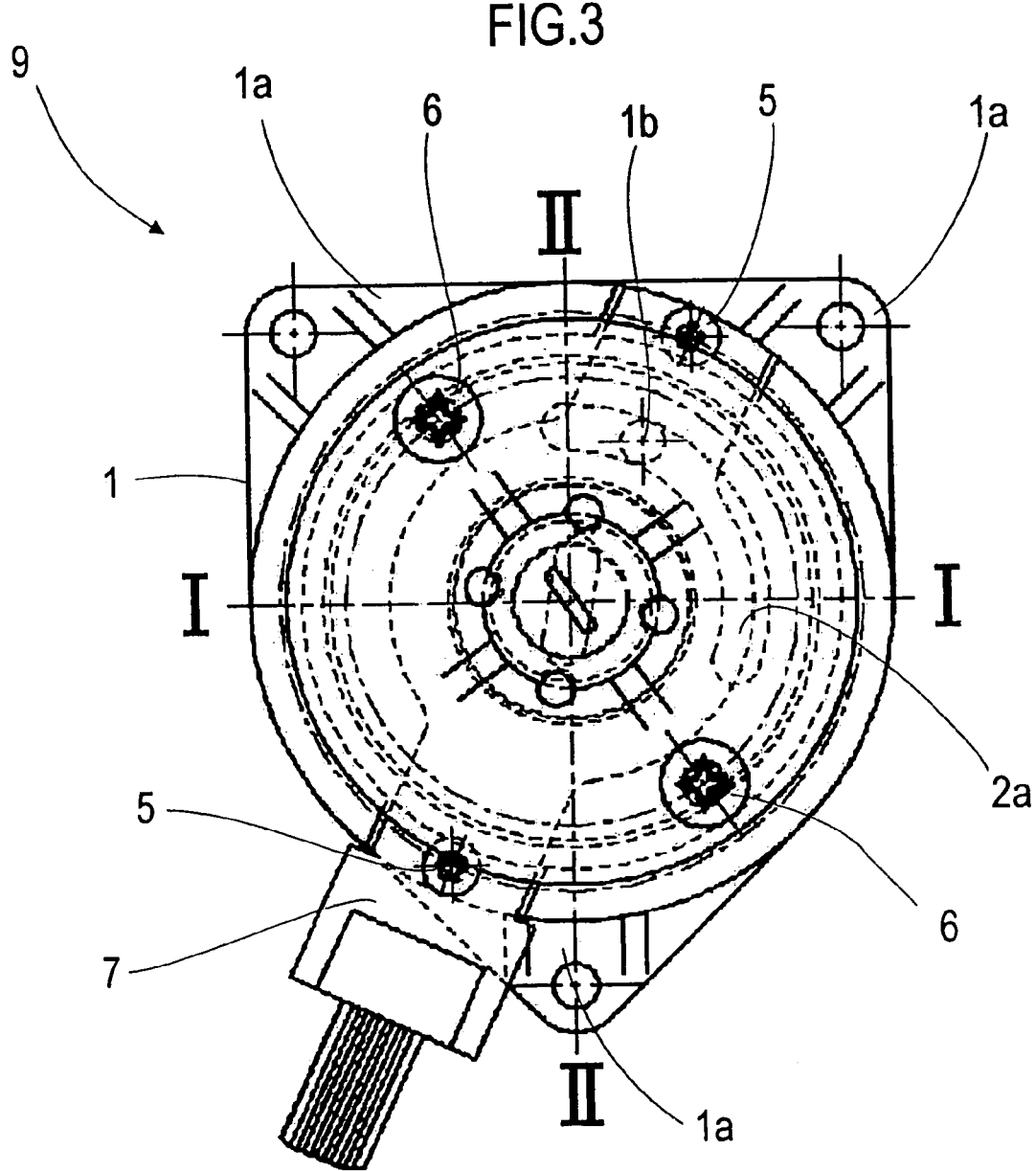
FIG. 3 is a top plan view of a magnetic absolute angular position sensor for electrically part-turn actuated valves.
Figure 4:
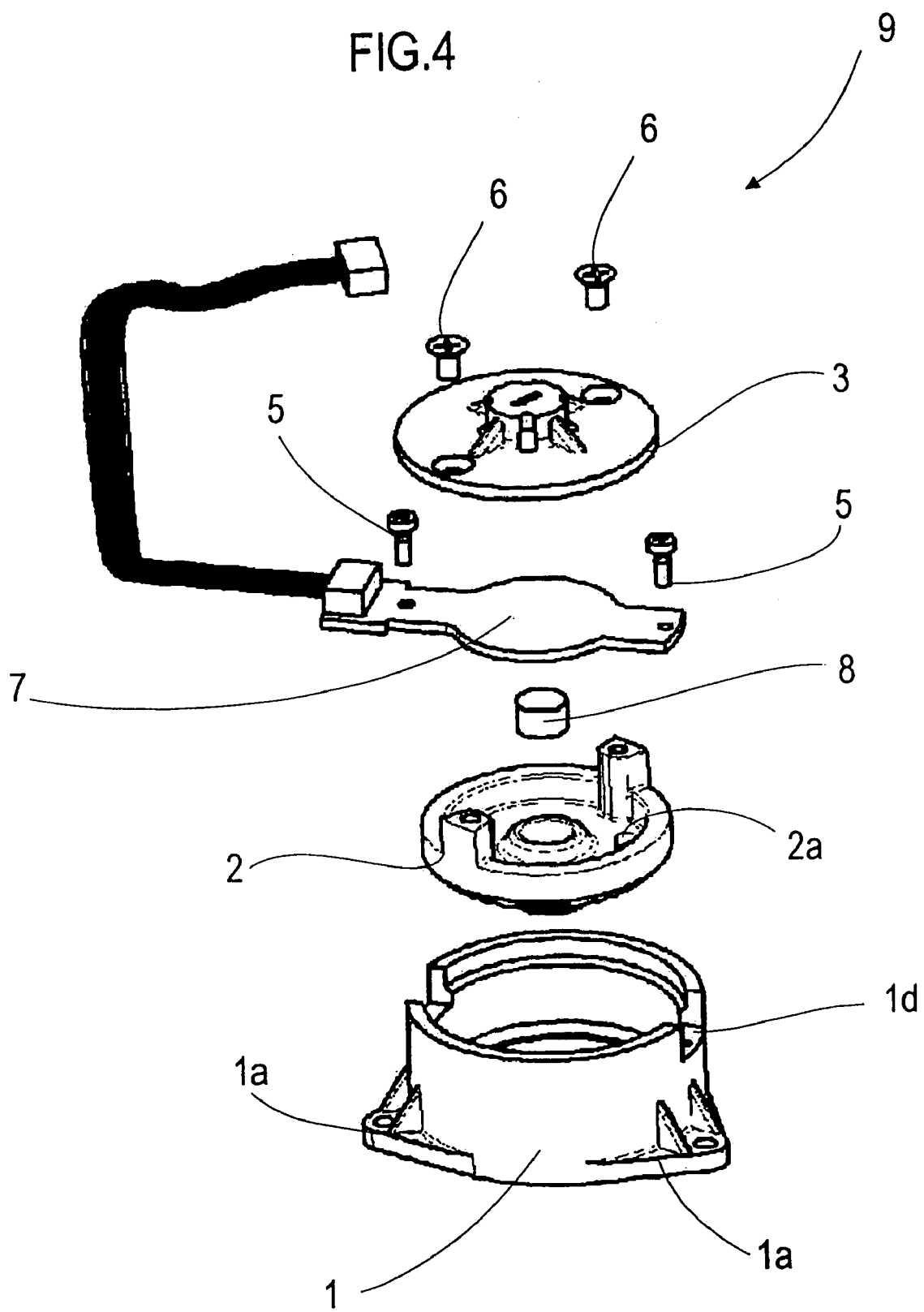
FIG. 4 is an exploded perspective view of the magnetic sensor of the previous figures.

Referring to FIGS. 1, 2, 3 and 4, an absolute magnetic sensor 9 is generally shown, which is formed by an essentially cylindrical case 1, closed by a cover 3, which is centered in the case 1 and secured to a support disk 2 located within the case 1.

The case 1 has three flange rims 1a, which are connected by bolts to a one-position stationary support, which might be the actuator of the shut-off valve to be controlled.

A circuit board 7 is also secured to the housing 1, in the vicinity of a permanent magnet 8 located in the support disk 2.

The circuit board 7, which has an essentially rectangular shape, has a widened central portion for housing electric circuits which, as the magnetic field direction changes due to the rotation of the support disk 2 connected to the valve actuator, provide the signals for determining the angle of rotation.

The circuit board 7 is introduced in two housings 1d formed in the case 1 and secured thereto by a pair of screws 5; the end portion of such circuit board 7 protrudes from the case 1 to allow the acquisition of the generated signals.

The support disk 2 is accommodated between the case 1 and the circuit board 7, and directly lies on the bottom of the case 1, while being held in contact with the case 1 by an elastic ring 4.

The support disk 2 contains the permanent magnet 8 on one side and the shaft of the valve to be controlled on the other side.

Also, the support disk 2 has a slot 2a which engages a pin 1b of the case 1; the angular width of such slot determines the maximum angle of rotation (about 110°) of the valve shaft.

The combined arrangement of the flange rims 1a, the pin 1b and the slot 2a which engages the pin 1a, provides a unique electrical and mechanical assembly, which requires no initial calibration.

The cover 3 is fastened by two screws 6 to the support disk 2.

Figure 5:
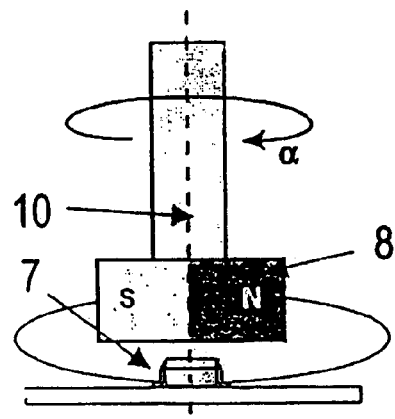
FIG. 5 is a schematic view of the operation of an angular position measuring sensor, which uses a permanent magnet system.
Figure 6:
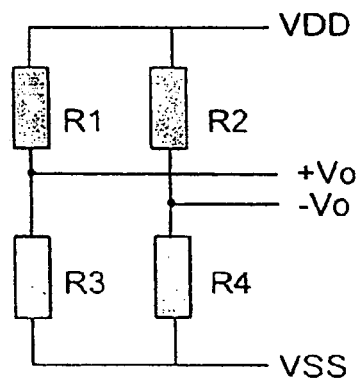
FIG. 6 shows a sensor with a Wheatstone bridge connection.

FIGS. 5 and 6 show a simplified diagram of the absolute magnet sensor 9 described above, which is only composed of a general shaft 10, whose angular position has to be controlled, on which the magnet 8 is integrated and of a circuit board 7, in front of the magnet 8, which is essentially characterized by a silicone substrate in which four permalloy strips 7a are embedded, in a Wheatstone bridge arrangement.

A rotation α of the shaft 10 causes a change in the direction of the magnetic field generated by the magnet 8: this change is detected by the Wheatstone bridge of the circuit board 7 in the form of a sinusoidal electric signal X, which is proportional to twice the angle of rotation α.

Hence, one Wheatstone bridge may be used to determine angles of rotation up to 90°.

Figure 7:
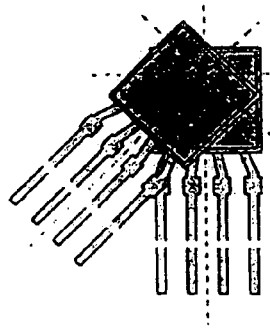
FIG. 7 shows the arrangement of two Wheatstone bridges.
Figure 8:
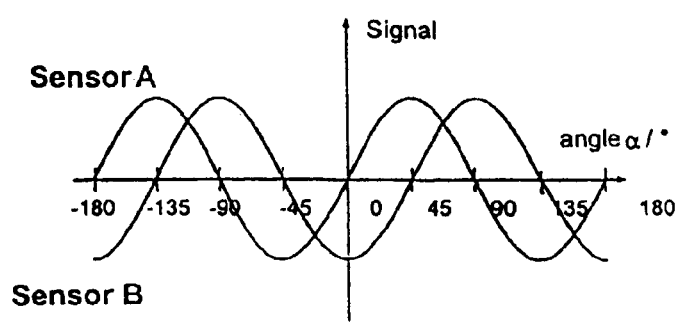
FIG. 8 shows the diagram of the output signal from the two bridges.

FIGS. 7 and 8 show the arrangement of two circuit boards 7 containing two Wheatstone bridges, arranged at 45° to each other in the silicone substrate.

In this arrangement, two electric signals X and Y are generated, which are offset a an angle of 90°, i.e. a sinusoidal and a cosinusoidal signal, each being proportional to twice the angle of rotation α.

In this arrangement, the amplitude of the signals changes with the sensor temperature, however both bridges are simultaneously embedded in the same silicone substrate and have the same characteristics: hence, both electric signals X and Y have no phase displacement and no compensation therebetween is required.

The signals X and Y, which are generated by a rotation α of the shaft 10, may be mathematically described as follows:

$$X(\alpha,T)=X_o(T)\cdot\mathrm{Sin}(2\alpha)$$

$$Y(\alpha,T)=Y_o(T)\cdot\mathrm{Cos}(2\alpha)$$

Also, by assuming that both electric signals X and Y have the same amplitude, i.e. $X_o=Y_o$, the angle α may be determined in a failsafe manner from the acquired electric signals X and Y, thanks to the following $$\alpha = \frac{1}{2}\arctan\left(\frac{X}{Y}\right)$$

Such result does not depend on the amplitude of the acquired electric signals X and Y. Therefore, temperature has no effect on measurements, and no further compensation coefficients are required.

What is claimed is:

1. A magnetic absolute angular position sensor for valves controlled by electric part-turn actuators, which is formed by an essentially cylindrical case 1, closed by a cover 3, in which a support disk (2) is located, containing a magnet (8) and a circuit board (7) in front of the latter, characterized in that a rotation α of the valve shaft (10) induces a change in the direction of the magnetic flux lines generated by the magnet (8), which is arranged to be integral with the valve shaft (10) through the support disk (2), and generates two electric signals X and Y in the circuit board (7), which are offset at an angle of 90°, i.e. a sinusoidal signal and a cosinusoidal signal, which are both proportional to twice the angle of rotation α, allowing to uniquely determine the angle of rotation of the valve, which may be a value of up to 120°.

2. A magnetic absolute angular position sensor for valves controlled by electric part-turn actuators as claimed in claim 1, characterized in that the two electric signals X and Y are acquired by means of two Wheatstone bridges, each formed by four permalloy strips (7*a*), arranged at 45° to each other and embedded in a silicone substrate of the circuit board (7).

3. A magnetic absolute angular position sensor for valves controlled by electric part-turn actuators as claimed in claim 1, characterized in that the support disk (2) has a slot (2*a*) which engages a pin (1*b*) of the case (1) and sets the rotation limits for the valve shaft.

4. A magnetic absolute angular position sensor for valves controlled by electric part-turn actuators as claimed in claim 1, characterized in that the case (1) has three flange rims (1*a*), which are connected by bolts to a one-position stationary support.

5. A magnetic absolute angular position sensor for valves controlled by electric part-turn actuators as claimed in claim 1, characterized in that the combined arrangement of the flange rims (1*a*), the pin (1*b*) and the slot (2*a*) which engages said pin (1*a*) provides a unique electrical and mechanical assembly, which requires no initial calibration.

* * * * *